(12) United States Patent
Li et al.

(10) Patent No.: US 7,975,225 B2
(45) Date of Patent: Jul. 5, 2011

(54) ITERATIVELY LOCATING A POSITION CORRESPONDING TO A DESIRED SEEK TIME

(75) Inventors: Li Li, Kirkland, WA (US); Dan Kroymann, Kirkland, WA (US); Rebecca C. Weiss, Vienna, VA (US); Wenbo Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 11/743,482

(22) Filed: May 2, 2007

(65) Prior Publication Data
US 2008/0276173 A1 Nov. 6, 2008

(51) Int. Cl.
*G06F 17/30* (2006.01)
(52) U.S. Cl. .................. 715/721; 707/745; 707/741
(58) Field of Classification Search .................. 715/721; 707/745, 741
See application file for complete search history.

(56) References Cited

U.S. PATENT DOCUMENTS

| | | | |
|---|---|---|---|
| 5,630,005 A | 5/1997 | Ort | |
| 6,157,771 A | 12/2000 | Brewer et al. | |
| 6,169,992 B1 | 1/2001 | Beall et al. | |
| 6,693,959 B1 | 2/2004 | Eckart et al. | |
| 7,106,944 B2 * | 9/2006 | Graan | 386/68 |
| 2002/0122357 A1 | 9/2002 | Negishi | |
| 2006/0068861 A1 | 3/2006 | Triestram et al. | |
| 2006/0136457 A1 | 6/2006 | Park et al. | |
| 2006/0168227 A1 | 7/2006 | Levine et al. | |
| 2006/0258459 A1 | 11/2006 | Davis et al. | |
| 2007/0016611 A1 | 1/2007 | Wang | |

FOREIGN PATENT DOCUMENTS

| | | |
|---|---|---|
| EP | 0786909 A2 | 7/1997 |
| JP | 2001243095 | 9/2001 |
| WO | WO03010970 A2 | 2/2003 |

OTHER PUBLICATIONS

"Flash", retrieved on Apr. 4, 2007, at <<http://www.devarticles.com/c/a/Flash/Adding-Video-and-Sound/8/>>, 2001-2007, pp. 1-5.
"Flash Article", retrieved on Apr. 4, 2007, at <<http://www.adobe.com/devnet/flash/articles/video_guide_03.html>>, pp. 1-5.
"Flash Video Primer", available at least as early as Apr. 3, 2007, at <<http://www.adobe.com/devnet/flash/articles/flash_flv.pdf>>, Opera Software ASA, 1995-2002, pp. 1-34.
PCT Search Report for PCT Application No. PCT/US2008/062136, mailed Sep. 22, 2008 (12 pages).

* cited by examiner

*Primary Examiner* — Namitha Pillai
(74) *Attorney, Agent, or Firm* — Lee & Hayes, PLLC

(57) ABSTRACT

Techniques enable locating a position within a file that corresponds to a desired seek time without having access to an index specifying the desired seek time's position. An iterative process may be used to estimate the position that corresponds to the desired seek time. The process may iterate through multiple estimations until a difference between a time corresponding to an estimated position and the desired seek time is within an acceptable amount or until the process reaches an iteration threshold. The file may then be played beginning at or near the desired seek time. The techniques may therefore allow a user to seek within a file while the user progressively downloads or streams the file.

17 Claims, 9 Drawing Sheets

200

CONTINUED FROM FIG. 2

216 SEEKER USES NEW DATA POINTS TO CALCULATE ANOTHER BITRATE ($BITRATE_2$) AND ANOTHER BYTE OFFSET (BYTE $OFFSET_2$) FOR $T_{DESIRED}$

218 READER RETRIEVES VIA BYTE STREAM DATA SAMPLE AT BYTE $OFFSET_2$ FROM MEMORY AND PASSES TO SEEKER

220 SEEKER EXTRACTS ACTUAL TIME ($T_2$) AT WHICH DATA SAMPLE AT BYTE $OFFSET_2$ SPECIFIES THE DATA SAMPLE SHOULD BE DISPLAYED

222 SEEKER STORES $T_2$ AND BYTE $OFFSET_2$ IN SEEK TABLE

224 REPEAT ACTS 216 THROUGH 222 UNTIL: (1) A TIME CORRESPONDING TO A BYTE OFFSET ≈ $T_{DESIRED}$, OR (2) AN ITERATION THRESHOLD IS REACHED

226 PLAY FILE BEGINNING AT OR NEAR $T_{DESIRED}$

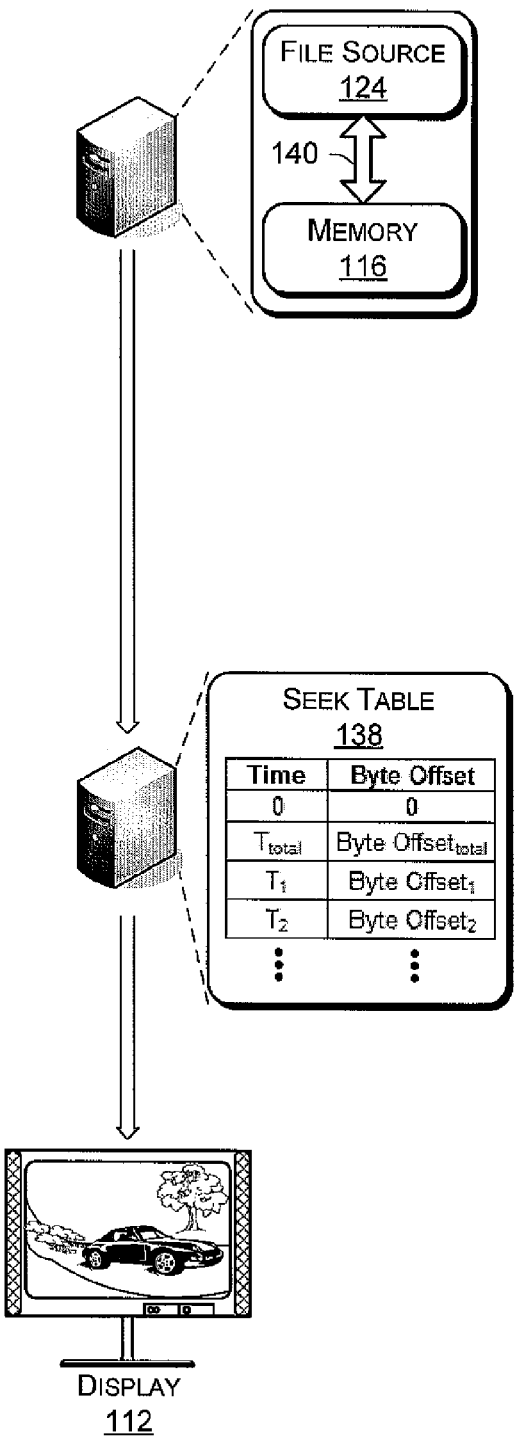

Fig. 3

ITERATIVELY LOCATING A POSITION CORRESPONDING TO A DESIRED SEEK TIME

BACKGROUND

While watching a video, users often wish to seek to a particular location in the video. For instance, a user watching a movie stored on a hard disk drive may wish to skip to a designated chapter that corresponds to a certain time in the movie. Alternatively or in addition, the user may wish to fast forward the movie for a certain amount of time. To seek to these desired locations, traditional video players look to an index that correlates movie times with byte offsets.

For instance, imagine that a user wishes to resume watching a movie at a time of 30:44. Furthermore, imagine that the movie has a length of 2 hours and a total size of 2 Gigabytes (GB). The index may therefore advise the video player that the time of 30:44 corresponds to a byte offset of 322,122,547. The video player may accordingly begin reading and playing the movie at this specified byte offset.

While a user may store an entire video on a hard disk drive before watching the video, the user may also choose to begin watching the video while the video downloads. In these instances, the video often resides within a file that includes the index at or near the end of the file. Therefore, when the user wishes to seek within a video while the video downloads, the video player typically does not have access to the index. As such, the video player cannot easily find a byte offset corresponding to a specified seek time.

Two processes to attempt to find such corresponding byte offsets exist. First, a video player may merely read some or all of the data samples already downloaded to determine the data sample that corresponds to the specified seek time. Once the video player finds this data sample, the player may begin reading and playing the video at a byte offset corresponding to this data sample. This process, however, generally proves to be computationally-expensive to a prohibitive degree.

Another process includes calculating an estimated bitrate for an entire video based upon a known video length and a known video size. After calculating this bitrate, the video player multiplies the bitrate by the seek time to roughly estimate the corresponding byte offset. While this method may prove suitable for constant bitrate (CBR) videos, this method generally proves unsuitable for variable bitrate (VBR) videos, as time and byte offset values within VBR videos typically do not correspond on a one-to-one basis.

SUMMARY

This document describes techniques capable of locating a position within a file that corresponds to a desired seek time without having access to an index specifying the desired seek time's position. Some implementations employ an iterative process to estimate the position that corresponds to the desired seek time. In these implementations, the process may iterate through multiple estimations until a difference between a time corresponding to an estimated position and the desired seek time is within an acceptable amount, or until the process reaches an iteration threshold. These implementations may then play the file, beginning at or near the desired seek time. The techniques therefore allow a user to seek within a file while the user progressively downloads or streams the file.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, and/or any other subject matter consistent with the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIGS. 2-3 illustrate an illustrative process for progressively downloading or streaming a file, receiving a request to seek to a desired time of the file, locating a position that corresponds to the desired time, and playing the file at or near the desired time.

DETAILED DESCRIPTION

Overview

The following discussion targets techniques capable of locating a position within a file that corresponds to a desired seek time without having access to an index specifying the desired seek time's position within the file. These techniques enable a user to accurately and efficiently seek to the desired time within a file, such as a video, song, or other file, while the file continues to download or stream. These techniques may utilize an iterative process before playing the file beginning at or near the desired seek time.

A first section entitled "Illustrative Operating Environment" sets forth an environment that may enable these and other actions. An "Illustrative Iterative Process" section follows, which describes how components of the illustrative environment may utilize an iterative process to enable playing a file at the desired seek time. A third section entitled "Iteratively Locating a Position Corresponding to a Desired Seek Time by Bracketing the Desired Seek Time" follows. This section describes how the claimed techniques may hone in on a position that corresponds to a desired seek time by using known data points that bracket the desired seek time. The discussion then concludes with a fourth section entitled "Iteratively Locating a Position Corresponding to a Desired Seek Time with use of Head and Tail Bitrates".

This brief introduction, including section titles and corresponding summaries, is provided for the reader's convenience and is not intended to limit the scope of the claims, nor the proceeding sections.

Illustrative Operating Environment

The following discussion provides an illustrative operating environment to assist the reader in understanding some ways in which various aspects of the techniques may be employed. The environment described below constitutes but one example and is not intended to limit application of the techniques to any one particular operating environment. Other environments may be used without departing from the spirit and scope of the claimed subject matter.

Figure 1:
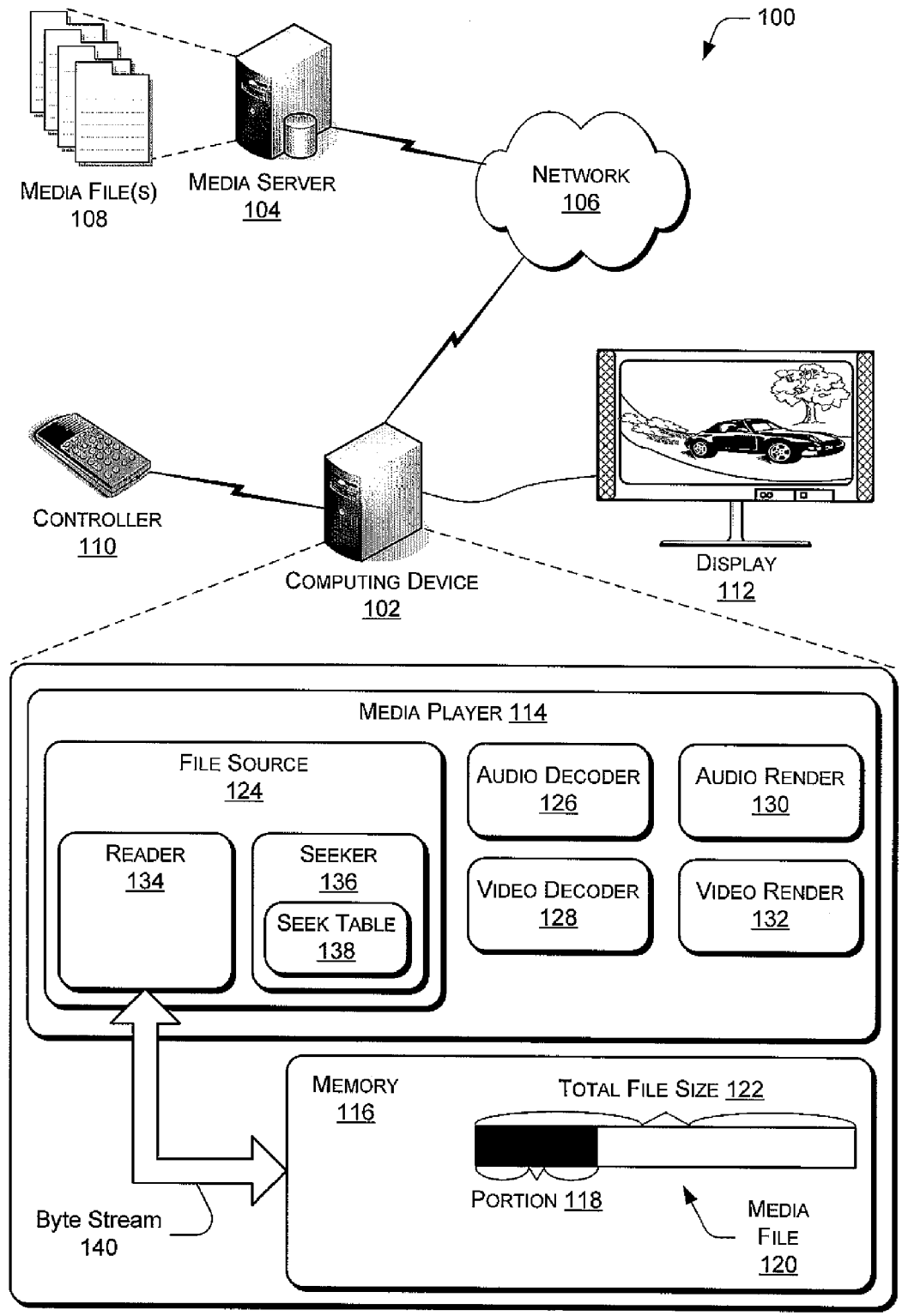
FIG. 1 illustrates an illustrative environment in which a media player may accurately locate a position within a file that corresponds to a desired seek time.

FIG. 1 illustrates one such environment 100 including a computing device 102 that couples to a media server 104 via a network 106. Media server 104 typically contains one or more media files 108 available for consumption by computing device 102. Media files 108 may include video files, audio files, text files, still images, and/or files of any other file type. These media files may also comprise data within a container of a certain format. For instance, these files may comprise data within an Advanced Systems Format (ASF) container or the like. In these instances, the media files 108 will typically include at least the following three sections, possibly in the following order: a header, data, and an index.

In addition, media files 108 are typically compressed. One or more of media files 108 may be, for example, encoded with a variable bitrate (VBR). VBR files typically vary an amount of data per time segment. In these instances, media files 108 will typically have a higher bitrate for more complex segments of the file and a lower bitrate for less complex segments. This typically results in a non-linear byte-offset-to-time ratio.

Because media files 108 are typically compressed, these files often utilize a key frame structure. Files built with this structure typically include a collection of "key frames", each of which is a self-contained video frame that can be decoded by itself. Meanwhile, "delta frames" or the like typically reside between key frames. These delta frames include information about changes from the preceding frame. As such, delta frames rely on the preceding key frame and potentially any preceding delta frames therebetween. While media files 108 may comprise this key frame structure, these files may also comprise any other compressed and/or non-compressed structure.

Returning to FIG. 1, computing device 102 may progressively download, stream, or otherwise acquire one or more media files 108 from media server 104. While environment 100 illustrates computing device 102, any other device capable of acquiring and playing media files may be similarly employed. For instance, operating environments may employ a video game console, personal computer, laptop computer, mobile phone, portable media player (e.g., a digital audio player or portable video player), or the like.

FIG. 1 also illustrates that computing device 102 couples to a controller 110 as well as a display 112. Controller 110 enables a user to provide input commands to computing device 102. For instance, if computing device 102 plays a movie, then the user may request via controller 110 that the device seek to a desired time of the movie. Display 112, meanwhile, may output video and potentially audio signals of the movie. In addition to display 112, computing device 102 may also couple to other output devices, such as speakers or the like.

Operating environment 100 may include one or more computer readable media storing computer-executable instructions that, when executed on one or more processors, perform acts described herein. As illustrated, computing device 102 includes a media player 114 for playing media files, as well as a memory 116 for storing the media files. Memory 116 is an example of computer readable media. FIG. 1 depicts that memory 116 currently contains a portion 118 of a media file 120. In some instances, media file 120 includes a video such as a movie, TV show, or the like. In other instances, the media file 120 may include an audio file, video file, multimedia file, or various other types of media files.

In this illustration, computing device 102 is in the process of downloading or streaming media file 120 having a certain total file size 122 from media server 104. At the moment depicted in FIG. 1, media player 114 may thus play portion 118 of media file 120 that currently resides in memory 116. Before playing portion 118, however, media player 114 may first verify that the current download or streaming rate will likely result in memory 116 storing all of file 120 before the media player reaches the end of the file.

As illustrated, media player 114 includes a file source 124, an audio decoder 126, a video decoder 128, an audio render 130, and a video render 132. Taken together, these components typically define an "audio/video pipeline" for reading and playing certain types of media files. File source 124 is the source of the pipeline. This component reads data samples within media file 120 and splays portions of the samples out to the respective decoders.

Audio decoder 126 and video decoder 128 receive audio and video portions of the data samples, respectively, to decode the samples for output. Finally, audio render 130 and video render 132 receive the decoded samples and either output the audio and video portions themselves or pass these portions on to output devices, such as display 112 and/or speakers.

File source 124 typically handles requests to seek to a desired time within media file 120. It is specifically noted that the phrase "desired time" includes both an exact time specified by a user or other requester, or a time approximate to this exact time (e.g., the exact specified time less a time interval equal to a maximum distance between key frames). In any event, in response to a request to seek to a "desired time", file source 124 determines a position (e.g., a byte offset) corresponding to the desired time before passing data samples beginning at that position to the decoders. If portion 118 of media file 120 includes an index, then file source 124 uses the index to look up a position corresponding to the desired time. If, however, media file 120 is of a container format (e.g., ASF) where the index resides at the end of the file, then portion 118 likely does not include an index. In these instances, file source 124 will typically itself calculate a position.

To calculate a position such as a byte offset that corresponds to the desired seek time, file source 124 includes a reader 134 and a seeker 136, the latter of which contains a seek table 138. In response to receiving a request to seek to a desired time of media file 120, seeker 136 begins iteratively calculating estimated byte offsets that estimate the desired time's byte offset within file 120. After calculating each estimated byte offset, seeker 136 typically passes this value to reader 134.

In response to receiving an estimated byte offset value, reader 134 pulls a data sample at this byte offset from media file 120 within memory 116 via a byte stream 140. After pulling this data sample, reader 134 passes the sample to seeker 136. Seeker 136 then reads a header associated with the data sample that identifies the actual time at which the data sample should be played. If media file 120 is a VBR file, then this actual time typically varies from the specified desired seek time. Seeker 136 therefore stores within seek table 138 the now-known data point including the byte offset value and the corresponding actual time. Seeker 136 may then use this known data point to calculate a second estimated byte offset for the desired seek time.

After seeker 136 locates a byte offset that generally corresponds to the desired seek time, or when an iteration threshold is reached, file source 124 begins passing data samples down the pipeline. If media file 120 comprises a video, then the video begins playing on display 112 beginning at or near the desired seek time. Illustrative environment 100 thus enables a user to accurately seek to a desired seek time while media file 120 progressively downloads or streams.

Illustrative Iterative Process

Figure 2:
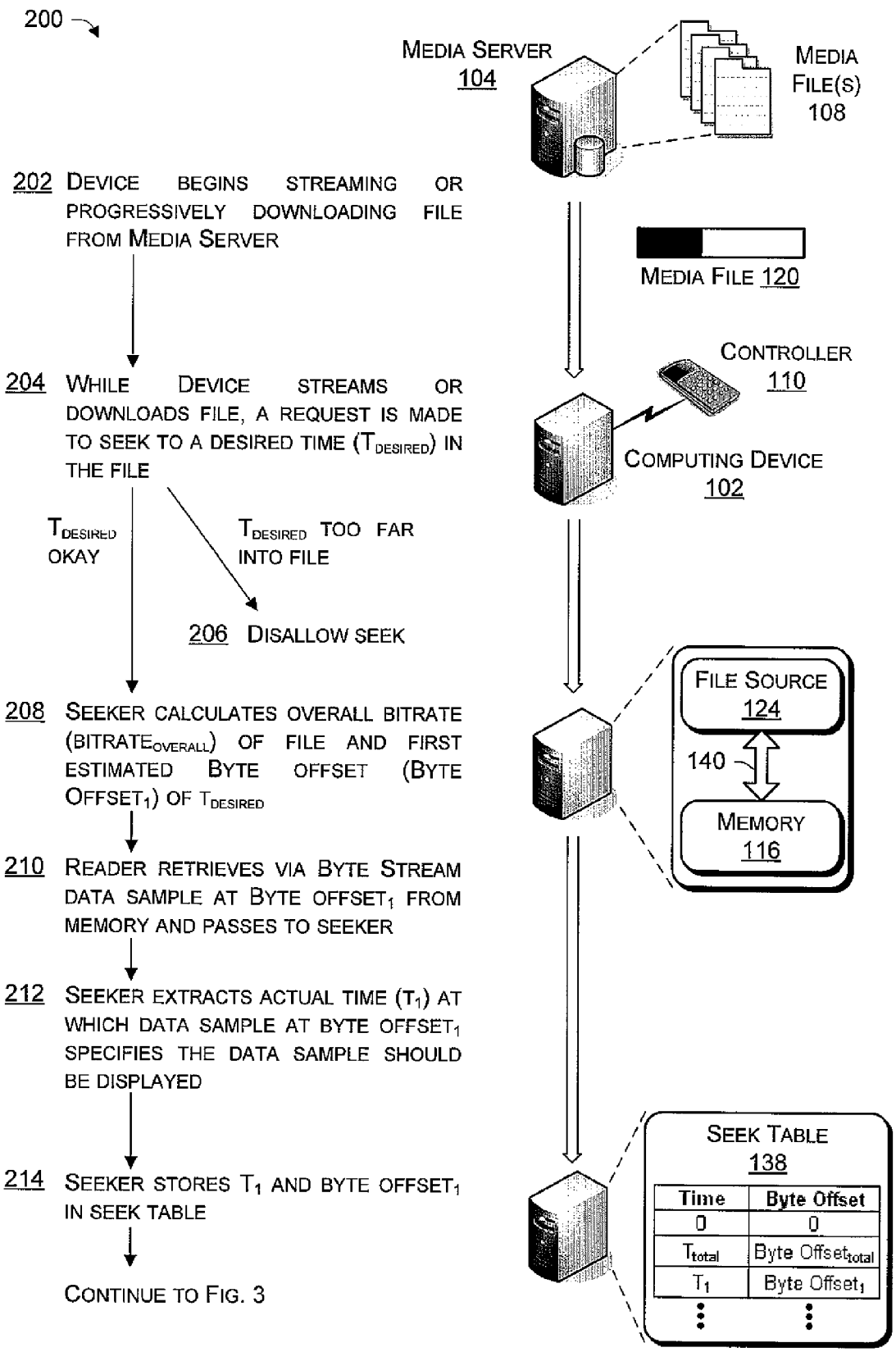

FIGS. 2-3 illustrate an illustrative process 200 for progressively downloading or streaming a file, receiving a request to seek to a desired time of the file, locating a position that corresponds to the desired time, and playing the file at or near the desired time. Process 200 (as well as other processes discussed below) is illustrated as a collection of acts in a logical flow graph, which represents a sequence of operations that can be implemented in hardware, software, or a combination thereof. In the context of software, the acts represent computer-executable instructions that, when executed by one or more processors, perform the recited operations.

Process 200 begins at act 202 when computing device 102 begins streaming or progressively downloading media file 120 from media server 104. Act 204 represents that while computing device 102 streams or downloads the file, a request is made to seek to a desired time ($T_{desired}$). This request may issue from a user of computing device 102 via controller 110. This request may also issue, however, from media player 114 itself. For instance, imagine that a user begins playing media file 120 before later stopping the file. Some time thereafter the user resumes playing the media file 120, although downloading of the file has yet to complete. In this instance, media player 114 may be configured to resume playing the file at the time at which the user stopped the file. The media player 114 may therefore itself request to seek to the time at which the user stopped the file ($T_{desired}$).

Again, the phrase "desired time" includes both an exact time specified by a user or other requester (e.g., media player 114), or a time approximate to this exact time (e.g., the exact specified time less a time interval equal to a maximum distance between key frames). In some instances, computing device 102 may wish to seek to a time slightly less than the exact time specified, and thus the desired time will be approximate to the exact time specified. In other instances, computing device 102 may instead wish to seek to a time equal to or slightly more than the exact specified time.

Seeking to a time slightly less than the exact specified time may serve to ensure that media player 114 plays the file beginning at or before the exact specified time. For instance, when media file 120 utilizes a key frame structure, the desired seek time may be equal to the exact specified time less a time interval between key frames (e.g., eight seconds for an ASF file). By subtracting a key frame, media player 114 may begin locating and discarding delta frames until a key frame is found. At this point, media player 114 may decode the key frame as well as proceeding delta frames. Media player 114 may then discard decoded frames that lie before the exact specified before actually decoding and playing the frame that corresponds to the exact specified time. Media player 114 could also begin playing before the exact specified time. Of course, note that a specified time interval that is less than or greater than a single key frame distance may also be used in some instances.

In any event, after receiving the request to seek to the desired time, media player 114 may in some instances consider whether or not computing device 102 will likely finish downloading or streaming the file before media player 114 reaches the end of the file. If media player 114 determines that this condition is not met because $T_{desired}$ is too far into media file 120, then act 206 represents that media player 114 may disallow the seek. If, however, this condition is met, then process 200 proceeds to act 208. Conversely, media player 114 could also wait until the iterative seek process is complete before determining whether or not $T_{desired}$ is too far into media file 120.

Assuming that media player 114 allows the desired seek, act 208 represents that seeker 136 calculates an overall bitrate (e.g., $bitrate_{overall}$) of media file 120. To make such a calculation, seeker 136 typically refers to seek table 138. At this point, seek table 138 likely contains only two data points: a position of zero corresponding to a time of zero, and a position (e.g., byte $offset_{total}$) corresponding to the end time of the file ($T_{total}$). Seek table 138 likely discovers the second data point from a header within media file 120 that specifies the size and length of the file. Seek table 138 thus likely discovers this second data point at or near the beginning of the downloading or streaming process. With use of these two known data points, seeker 136 may calculate $bitrate_{overall}$ with use of the following equation:

$$bitrate_{overall} = [(byte\ offset_{total} - 0)/(T_{total} - 0)] * 8 \quad (1)$$

Having calculated the overall bitrate, act 208 also represents that seeker 136 may calculate a first estimated position (e.g., byte $offset_1$) for $T_{desired}$. To do so, seeker 136 may utilize the following equation:

$$byte\ offset_1 = bitrate_{overall} * T_{desired} * 0.125 \quad (2)$$

Act 210 represents that seeker 136 may then instruct reader 134 to retrieve (via byte stream 140) a data sample located at byte $offset_1$ from memory 116. After seeker 136 receives the data sample from reader 134, act 212 represents that seeker 136 extracts the actual time ($T_1$) at which the data sample at byte $offset_1$ specifies the data sample should be displayed. At act 214, seeker 136 stores this now-known data point ($T_1$, byte $offset_1$) within seek table 138.

Having discovered a first estimated position with a first estimated time, process 200 may proceed to use this data point to calculate a second estimated position and a corresponding second estimated time. As illustrated, process 200 proceeds to act 216, which represents that seeker 136 uses the new data point to calculate another bitrate (e.g., $bitrate_2$). Act 216 also represents that seeker 136 may use this new bitrate to calculate another position (e.g., byte $offset_2$). Two illustrative processes of calculating this new bitrate and position are described below with reference to FIGS. 4-6 and 7-9, respectively.

Once $bitrate_2$ and byte $offset_2$ have been calculated, act 218 represents that reader 134 retrieves via byte stream 140 a data sample at byte $offset_2$. At act 220, seeker 136 extracts the actual time ($T_2$) at which this data sample specifies that it should be displayed. Similar to act 214, seeker 136 stores this new data point ($T_2$, byte $offset_2$) within seek table 138 at act 222.

Act 224, meanwhile, represents that acts 216 through 222 repeat until a time between an estimated time corresponding to an estimated byte offset and $T_{desired}$ is within a specified tolerance zone, or until an iteration threshold is reached. In some instances, this specified tolerance zone may be set as the maximum distance between key frames (e.g., 8 seconds) of media file 120. The iteration threshold, meanwhile, may comprise a maximum number of iterations (e.g., four) or any other configurable threshold. Finally, act 226 represents that media player 114 will eventually begin playing media file 120 at a time that is typically at or near $T_{desired}$. This time when play begins may be exactly or approximately equal to the requestor-specified time.

Iteratively Locating a Position Corresponding to a Desired Seek Time by Bracketing the Desired Seek Time Having discussed general process 200, this section describes a specific and non-limiting implementation of iteratively locating a position that corresponds to a desired seek time. This particular implementation utilizes known data points that bracket the desired seek time. While this section discusses positions as byte offsets, other position measurements may also be utilized.

Figure 4:
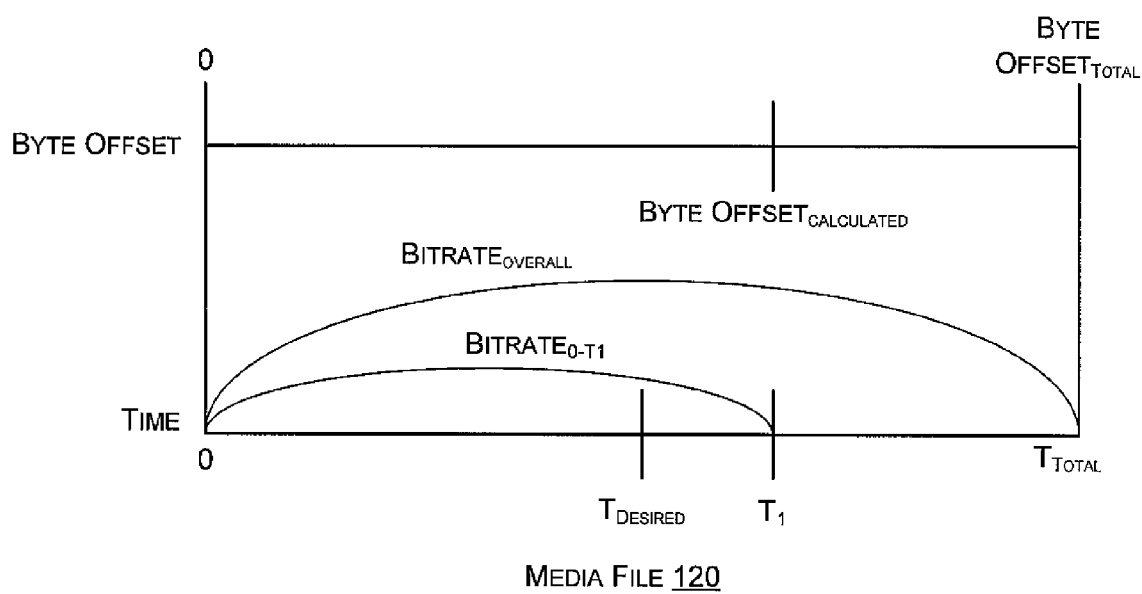
FIG. 4 depicts illustrative attributes of the file from FIG. 1.

Reference is first made to FIG. 4, which illustrates illustrative attributes of media file 120 from FIG. 1. FIG. 4 illustrates that media file 120 has a byte offset of zero at a time of zero, as well as a byte offset$_{total}$ at a time of $T_{total}$. Again, these two data points are generally known at or near the time at which computing device 102 begins to download or stream media file 120. FIG. 4 also illustrates that an overall bitrate (bitrate$_{overall}$) extends the length of the file, while a bitrate$_{0-T1}$ extends from time zero to a determined time of $T_1$. Note that times used to calculate bitrate$_{0-T1}$ bracket in the desired seek time ($T_{desired}$). Finally, FIG. 4 illustrates that byte offset$_1$ corresponds to $T_1$. As discussed above, $T_1$ is usually extracted from a data sample taken at byte offset$_{calculated}$.

Figure 5:
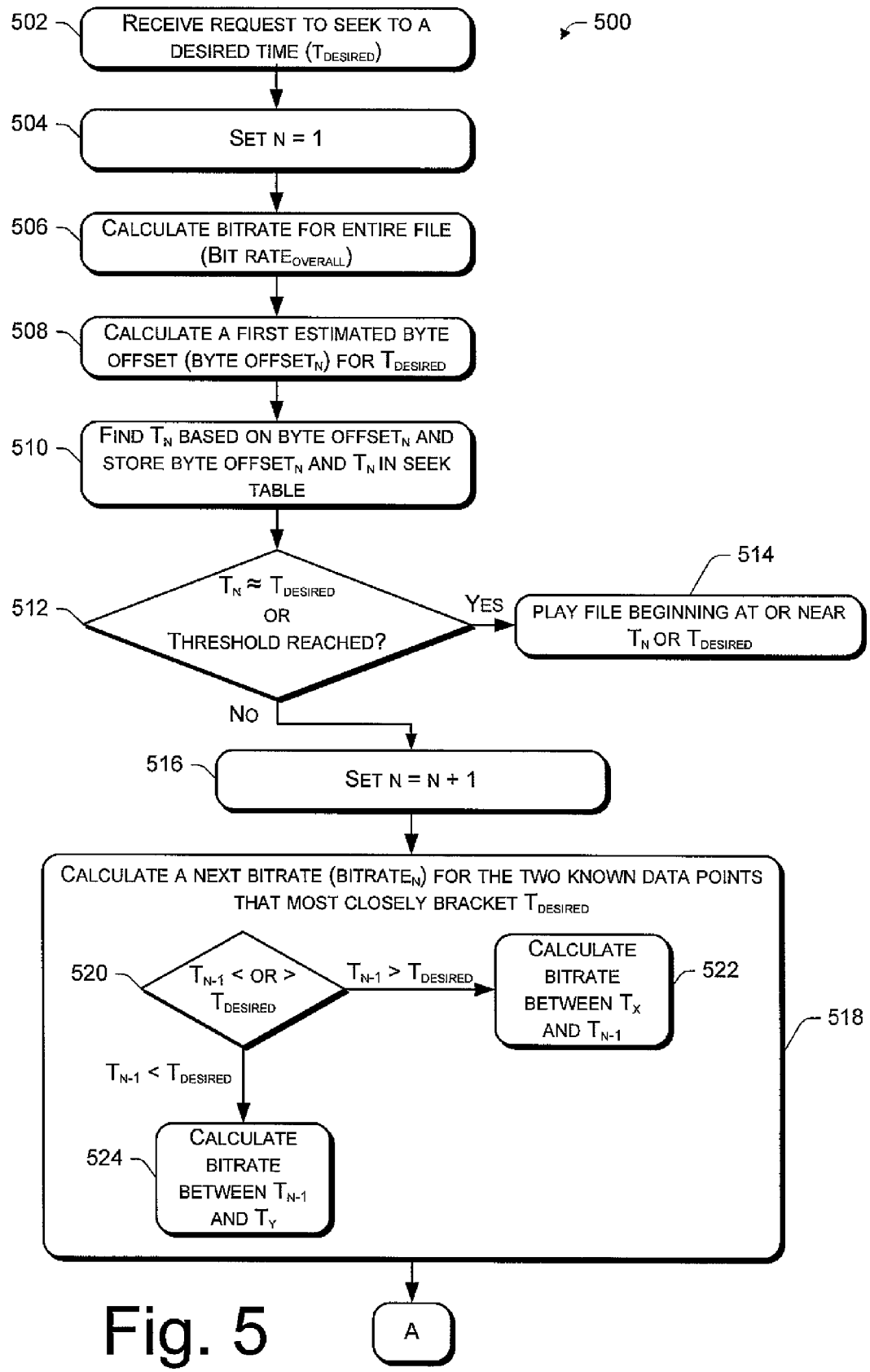
FIGS. 5-6 illustrate another illustrative process for locating a position within a file that corresponds to a desired seek time, the process utilizing two known data points that bracket the desired time.
Figure 6:
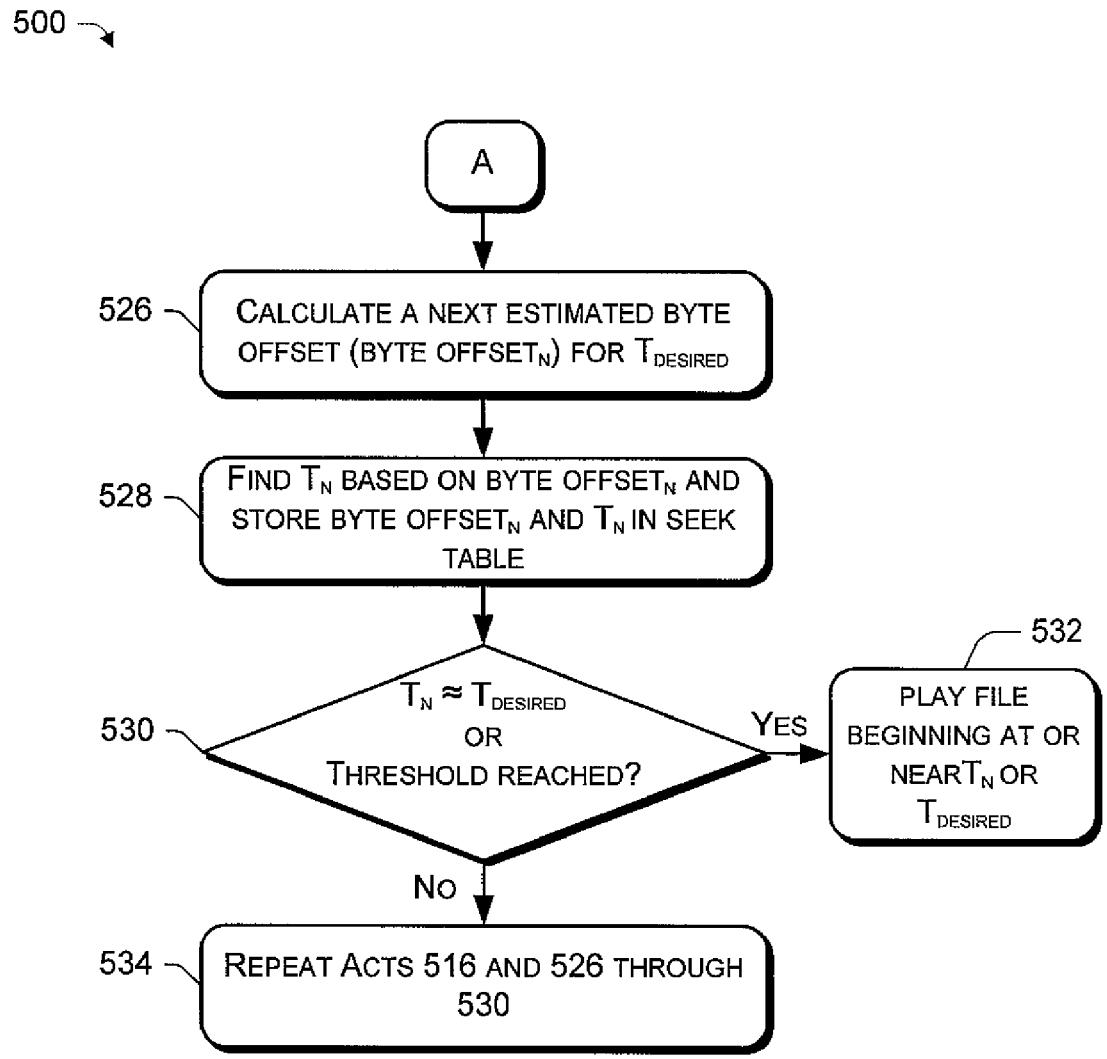

With this illustration of media file 120 in mind, reference is now made to FIGS. 5-6. These figures illustrate an illustrative iterative process 500 for locating a position within a file that corresponds to a desired seek time, the iterative process utilizing two known data points that bracket the desired time.

Process 500 begins at act 502, where a request to seek to a desired time ($T_{desired}$) is received. Again, this desired time may correspond to an exact specified time, or some approximate of this (e.g., the exact specified time less a time interval between key frames). Act 504, meanwhile, sets a counter "N" equal to one. At act 506, an overall bitrate (bitrate$_{overall}$) is calculated for entire media file 120. Calculation of this bitrate is discussed above with reference to equation one. Act 508, meanwhile, calculates a first estimated byte offset (byte offset$_N$) for $T_{desired}$. Again, this calculation is discussed above in regards to equation two. Also as discussed above, act 510 extracts an actual time ($T_N$) from a data sample at byte offset$_N$ and then stores this data point ($T_N$, byte offset$_N$) in seek table 138.

After determining a first $T_N$, act 512 queries whether a time between $T_N$ and $T_{desired}$ is less than a specified tolerance zone. This act also queries whether an iteration threshold has been reached. If act 512 positively answers either of these queries, then act 514 either begins playing media file 120 at a time of $T_N$ or $T_{desired}$. As discussed above, act 514 may discard data samples that lie before the data sample corresponding to $T_{desired}$ (or samples that lie before the requestor-specified time), at which point act 514 may begin playing the file. Conversely, act 514 may begin playing the file at $T_N$ (or the next key frame thereafter).

If act 512, however, answers both illustrated queries in the negative, then process 500 continues to act 516. At act 516, the counter "N" updates by one, such that N now equals two in the instant example. Next, act 518 represents calculation of a next bitrate (bitrate$_N$) for the two known data points that most closely bracket $T_{desired}$.

To calculate such a bitrate, act 518 itself includes several acts. First, act 520 queries whether the time corresponding to the last iteration ($T_{N-1}$) is greater than or less than $T_{desired}$. If greater than, then act 522 calculates a bitrate between $T_X$ and $T_{N-1}$. Note that $T_X$ represents the known data point between $T_0$ and $T_{desired}$ that is closest to $T_{desired}$. Note also that $T_X$ has a corresponding byte offset of byte offset$_X$. With this in mind, the following equation represents calculation of this bitrate:

$$\text{bitrate}_N = [(\text{byte offset}_{N-1} - \text{byte offset}_X)/(T_{N-1} - T_X)]*8 \quad (3)$$

For this iteration (N=2), the data point $T_0$, byte offset$_0$ (i.e., 0, 0) would actually represent $T_X$ and byte offset$_X$, respectively. Again, seek table 138 likely only contains three data points at this point, two of which correspond to the beginning and end of the file.

Returning to decision block 520, if $T_{N-1}$ is less than $T_{desired}$, then act 524 calculates a bitrate between $T_{N-1}$ and $T_Y$. Again, note that $T_Y$ represents the known data point between $T_{desired}$ and $T_{total}$ that is closest to $T_{desired}$. Note also that $T_Y$ has a corresponding byte offset of byte offset$_Y$. The following equation represents calculation of this bitrate:

$$\text{bitrate}_N = [(\text{byte offset}_Y - \text{byte offset}_{N-1})/(T_Y - T_{N-1})]*8 \quad (4)$$

For this iteration (N=2), note that the data point $T_{total}$, byte offset$_{total}$ would actually represent $T_Y$ and byte offset$_Y$, respectively. Again, seek table 138 likely only contains three data points at this point, two of which correspond to the beginning and end of the file.

Having calculated a bitrate for this iteration (N=2), act 526 calculates an estimated byte offset (byte offset$_N$) for $T_{desired}$. If bitrate$_N$ was calculated according to equation three above, then byte offset$_N$ may be calculated with the following equation:

$$\text{byte offset}_N = [\text{bitrate}_N*(T_{desired} - T_X)]*0.125 + \text{byte offset}_X \quad (5)$$

If, however, bitrate$_N$ was calculated according to equation four above, then byte offset$_N$ may be calculated with the following equation:

$$\text{byte offset}_N = [\text{bitrate}_N*(T_{desired} - T_{N-1})]*0.125 + \text{byte offset}_{N-1} \quad (6)$$

Having now calculated a byte offset for this iteration (N=2), act 528 extracts an actual time ($T_N$) from a data sample at byte offset$_N$. Act 528 then stores this data point ($T_N$, byte offset$_N$) in seek table 138. Act 530 then queries whether a time between $T_N$ and $T_{desired}$ is less than a specified tolerance zone. This act also queries whether an iteration threshold has been reached. If act 530 positively answers either of these queries, then act 532 stops iterating and begins playing media file 120 at a time equal or approximate to $T_N$ or $T_{desired}$ (e.g., the requestor-specified time). If, however, act 530 answers both questions in the negative, then act 534 dictates that acts 516 and 526 through 530 are repeated.

Process 500 thus calculates bitrates between nearest known data points that bracket a desired seek time. With use of each calculated bitrate, an estimated byte offset for the desired seek time can be calculated, at which point an actual time corresponding to that byte offset can be extracted from media file 120. By continuing to use data points that straddle the desired seek time, the estimated byte offset will typically approach the actual byte offset that corresponds to the desired seek time. Process 500 thus enables media player 114 to accurately seek to a desired seek time without use of an index specifying the desired seek time's position within media file 120.

Iteratively Locating a Position Corresponding to a Desired Seek Time with Use of Head and Tail Bitrates This section describes another specific and non-limiting implementation of iteratively locating a desired seek time. This particular implementation, however, utilizes head and tail bitrates calculated off of known data points within media file 120. Again, while this section discusses positions as byte offsets, other position measurements may also be utilized.

Figure 7:
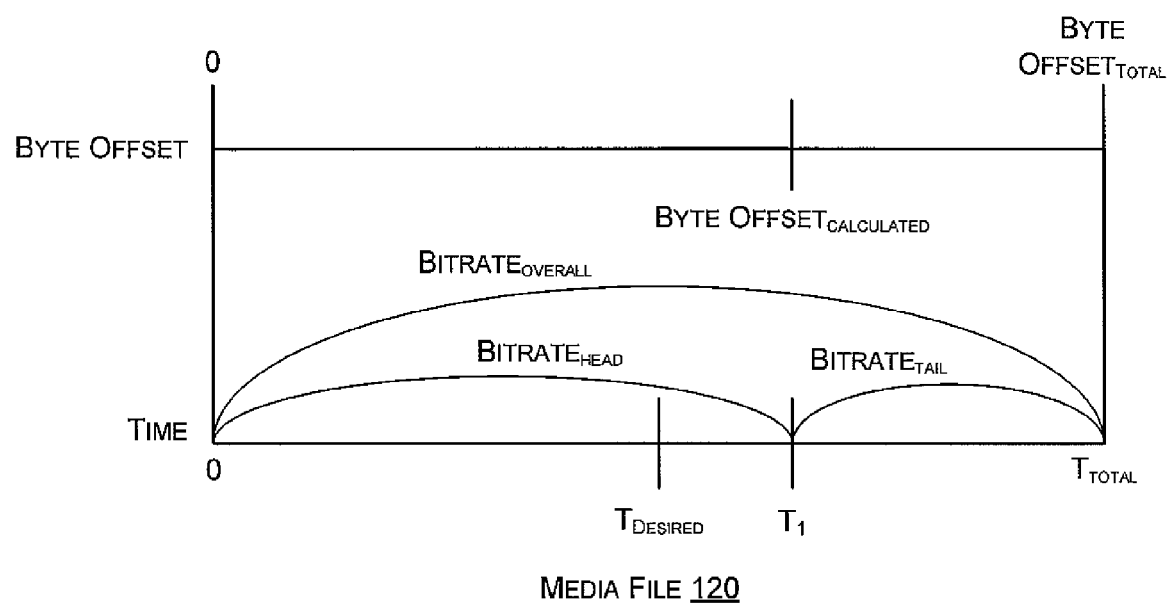
FIG. 7 illustrates additional illustrative attributes of the file from FIG. 1.

Reference is first made to FIG. 7, which illustrates illustrative attributes of media file 120 from FIG. 1. FIG. 7 depicts attributes similar to those depicted in FIG. 4, with the addition of head and tail bitrates. As illustrated, media file 120 is shown to include a head bitrate (bitrate$_{head}$) calculated between $T_0$ and $T_1$. Media file 120 is also shown to include a tail bitrate (bitrate$_{tail}$) calculated between $T_1$ and $T_{total}$.

Generally, a head bitrate is defined as a bitrate between a first known data point (T, byte offset) and a second known data point that is closer to the beginning of the file than the first known data point. For instance, refer to FIG. 7, which shows attributes of a media file after one desired position estimation (byte offset$_{calculated}$) that corresponds to $T_1$. Because only a first estimation has been generated in this illustration, seek table 138 likely stores the following three data points: a data point corresponding to the beginning of the file (0,0), a data point corresponding to the first estimation ($T_1$, byte offset$_{calculated}$), and a data point corresponding to the end of the file ($T_{total}$, byte offset$_{total}$). In this instance, a head bitrate calculated off of $T_1$ typically measures a bitrate between $T_1$ and a $T_0$ (0), the latter of which is, at this point, the only known data point that is closer to the beginning of the file than $T_1$.

In some instances, a head bitrate may be calculated between a first known data point and a second known data point that is the closest known data point to the first known data point of all known data points that are closer to the beginning of the file. With reference again to FIG. 7, a head bitrate calculated off of $T_1$ would again measure the bitrate between $T_1$ and $T_0$ in these instances. If, however, a known data point existed between $T_0$ and $T_1$, then a head bitrate off of $T_1$ would be calculated between this known data point and $T_1$. In other words, a head bitrate calculated off of a certain data point may measure a bitrate between that certain data point and the next closest known data point in the direction of the beginning of the file.

A tail bitrate, meanwhile, is generally defined as a bitrate between the first known data point and a second known data point that is closer to the end of the file than the first known data point. Again, with reference to FIG. 7, at the time when only three data points are known, a tail bitrate off of T1 may measure the bitrate between $T_1$ and $T_{total}$. In some instances, a tail bitrate may be calculated between a first known data point and a second known data point that is the closest known data point to the first known data point of all known data points that are closer to the end of the file. In other words, a tail bitrate calculated off of a certain data point may measure a bitrate between that certain data point and the next closest known data point in the direction of the end of the file.

Figure 8:
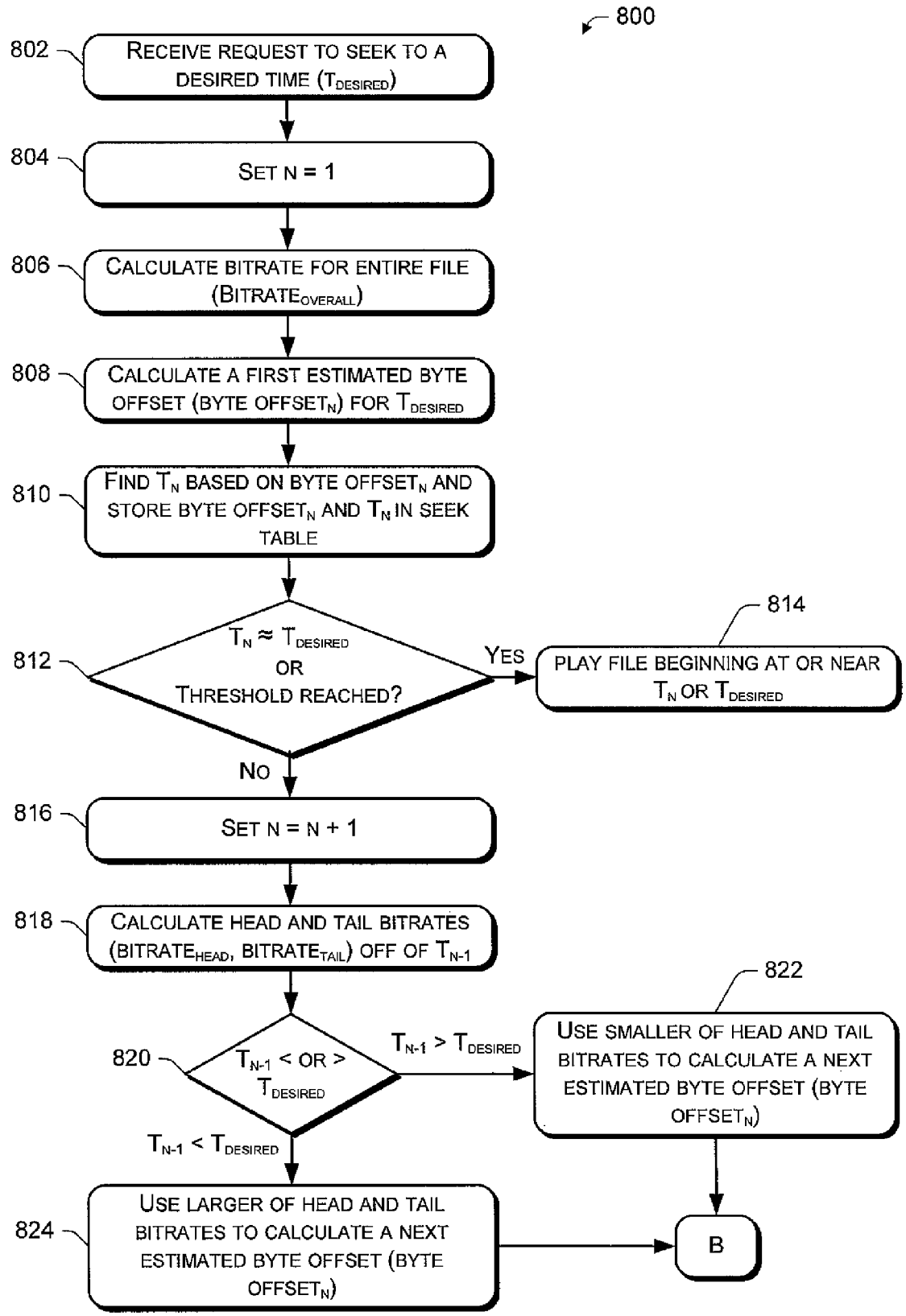
FIGS. 8-9 illustrate another illustrative process for locating a position within a file that corresponds to a desired seek time, the process utilizing head and tail bitrates measured off of known data points.
Figure 9:
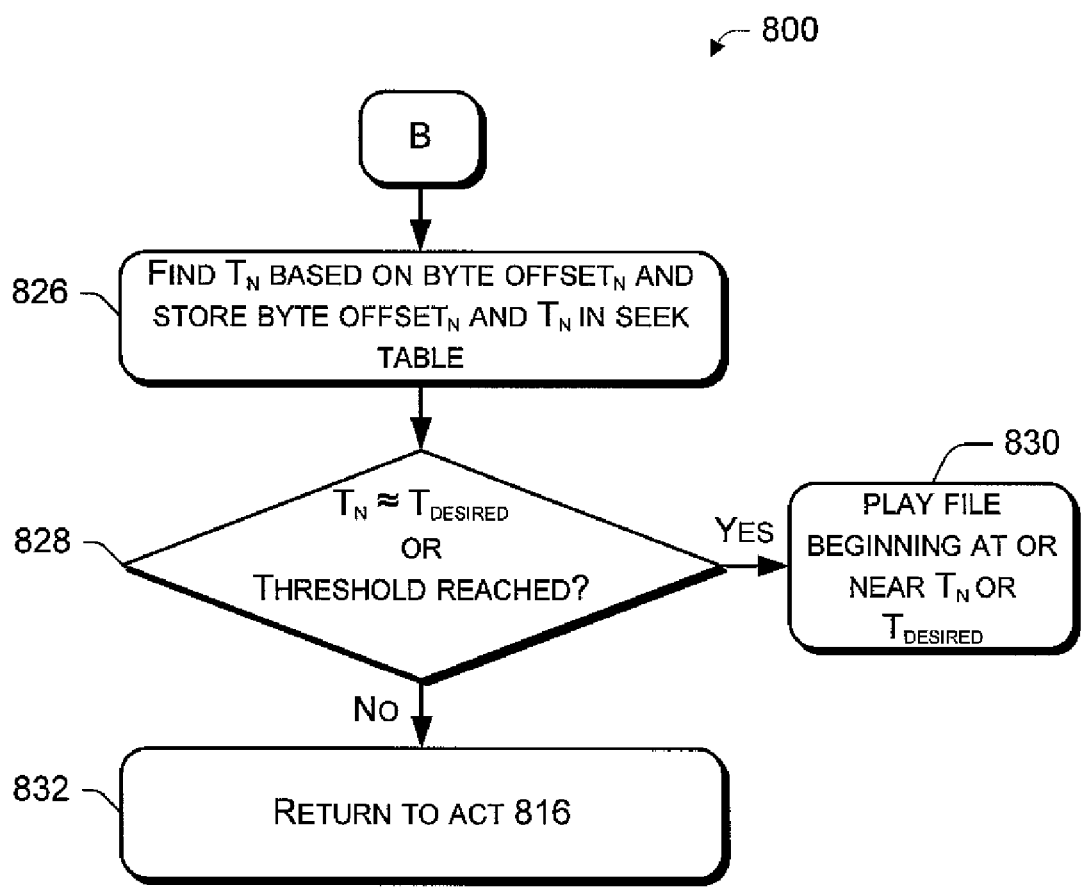

Having discussed head and tail bitrates, reference is now made to FIGS. 8-9, which describe an illustrative iterative process 800 for locating a position within a file that corresponds to a desired seek time. Similar to process 500, process 800 begins when act 802 receives a request to seek to a desired time ($T_{desired}$). Again, this desired time may correspond to an exact specified time, or some approximate of this (e.g., the exact specified time less a maximum time interval between key frames).

Act 804, meanwhile, sets a counter "N" equal to one. At act 806, an overall bitrate (bitrate$_{overall}$) is calculated for entire media file 120. Calculation of this bitrate is discussed above with reference to equation one. Act 808, meanwhile, calculates a first estimated byte offset (byte offset$_N$) for $T_{desired}$. Again, this calculation is discussed above in regards to equation two. Act 810 then extracts an actual time ($T_N$) from a data sample at byte offset$_N$ and stores this data point ($T_N$, byte offset$_N$) in seek table 138.

After determining a first $T_N$, act 812 queries whether a time between $T_N$ and $T_{desired}$ is less than a specified tolerance zone. This act also queries whether an iteration threshold has been reached. Again, if act 812 positively answers either of these queries, then act 814 begins playing media file 120 at a time equal or approximate to $T_N$ or $T_{desired}$.

If act 812 answers these queries in the negative, however, then process 800 continues to act 816. At act 816, the counter "N" updates by one, such that N now equals two. Act 818 then calculates head and tail bitrates off of $T_{N-1}$. To calculate these bitrates, the following equations may be used:

$$\text{bitrate}_{head} = [(\text{byte offset}_{N-1} - \text{byte offset}_\alpha)/(T_{N-1} - T_\alpha)] * 8 \quad (7)$$

$$\text{bitrate}_{tail} = [(\text{byte offset}_\beta - \text{byte offset}_{N-1})/(T_\beta - T_{N-1})] * 8 \quad (8)$$

In the above equations, note that $T_\alpha$ corresponds to a time closest to $T_{N-1}$ of all times having a known byte offset that are closer to $T_0$ than $T_{N-1}$. Note also that $T_\alpha$ has a known byte offset of byte offset$_\alpha$. Additionally, $T_\beta$ corresponds to a time closest to $T_{N-1}$ of all times having a known byte offset that are closer to $T_{total}$ than $T_{N-1}$. $T_\beta$ likewise has a known byte offset of byte offsets$\beta$.

Having calculated head and tail bitrates off of $T_{N-1}$, act 820 queries whether $T_{N-1}$ is greater than or less than $T_{desired}$. In some illustrative instances, if act 820 determines the former, then act 822 uses the smaller of the calculated head and tail bitrates to calculate an estimated byte offset (byte offset$_N$). By using this smaller value, the chances of the next iteration falling on the other side of $T_{desired}$ are enhanced. As such, choosing the smaller of the values when the estimated time is greater than $T_{desired}$ lessens the chance that a spiked bitrate will adversely affect iteration process 800. Of course, in some instances, the larger of the head and tail bitrates may be used when $T_{N-1}$ is greater than $T_{desired}$, as shown in equations (9) and (10) below, such that the next iteration falls nearer the beginning of the file than if the smaller bitrate is used.

If act 820 determines that $T_{N-1}$ is less than $T_{desired}$, however, then act 824 uses the larger of the calculated head and tail bitrates to calculate an estimated byte offset (byte offset$_N$). Again, by using the larger value in these instances, the chances of the next iteration falling on the other side of $T_{desired}$ are enhanced. As such, choosing the larger of the values when the estimated time is less than $T_{desired}$ lessens the chance that a spiked bitrate will adversely affect iteration process 800.

The following equations may be used to calculate an estimated byte offset$_N$ with either a head or a tail bitrate:

$$\text{byte offset}_N = [\text{bitrate}_{head} * (T_{desired} - T_{N-1})] * 0.125 + \text{byte offset}_{N-1} \quad (9)$$

$$\text{byte offset}_N = [\text{bitrate}_{tail} * (T_{desired} - T_{N-1})] * 0.125 + \text{byte offset}_{N-1} \quad (10)$$

Having calculated a byte offset$_N$ for this iteration (N=2), act 826 represents that a data sample at the calculated byte offset may be pulled from media file 120. An actual time at which the data sample should be displayed may then be extracted from this data sample. Act 826 also represents that this data point ($T_N$, byte offset$_N$) may then be stored in seek table 138.

Act 828 again queries whether a time between $T_N$ and $T_{desired}$ is less than a specified tolerance zone. This act also queries whether an iteration threshold has been reached. Again, if act 828 positively answers either of these queries, then act 830 stops iterating and begins playing media file 120 at a time equal or approximate to $T_N$ or $T_{desired}$. If act 828 answers these queries in the negative, however, then act 832 instructs return to act 816.

Process 800 thus calculates head and tail bitrates between nearest known data points and determines which of the two bitrates should be used to calculate a next byte offset. Each calculated byte offset may then be used to determine an actual time that corresponds to that byte offset. By continuing to acquire data points in this manner, the estimated byte offsets will typically approach the actual byte offset that corresponds to the desired seek time. Process 800 thus enables media player 114 to accurately seek to a desired seek time without use of an index specifying the desired seek time's position in media file 120.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
receiving a request to seek to a desired time within a file;
determining a first estimated time within the file responsive to the receiving of the request, the first estimated time comprising an estimate of the desired time;
determining a second estimated time within the file with use of the first estimated time, the second estimated time also comprising an estimate of the desired time; and
determining a successive estimated time within the file with use of a previously estimated time and a selected known time selected from a group of known times within the file, the successive estimated time also comprising an estimate of the desired time, wherein:
when the previously estimated time is less than the desired time, the selected known time is selected that is greater than the desired time and has a known position that most closely brackets the desired time with a known position of the previously estimated time; and
when the previously estimated time is greater than the desired time, the selected known time is selected that is less than the desired time and has a known position that most closely brackets the desired time with a known position of the previously estimated time.

2. A method as recited in claim 1, further comprising progressively downloading or streaming the file and wherein the request to seek to the desired time within the file is received before the file finishes downloading or streaming.

3. A method as recited in claim 2, wherein the request to seek to the desired time within the file is received before an index of the file is received, the index specifying a position of the desired time.

4. A method as recited in claim 1, wherein the determining of the first estimated time comprises:
calculating a bitrate for the file;
multiplying the bitrate for the file by the desired time to determine an estimated position that estimates a desired position corresponding to the desired time;
retrieving a data sample at the estimated position; and
extracting the first estimated time from the estimated position.

5. A method as recited in claim 1, wherein the determining of the second estimated time comprises:
determining a first known time at a known position that most closely brackets the desired time with a known position of the first estimated time, the first known time being:
greater than the desired time when the first estimated time is less than the desired time; or
less than the desired time when the first estimated time is greater than the desired time;
calculating a bitrate for a portion of the file between the first estimated time and the first known time;
multiplying the bitrate for the portion by the desired time to determine an estimated position that estimates a desired position that corresponds to the desired time;
retrieving a data sample at the estimated position; and
extracting the second estimated time from the estimated position.

6. A method as recited in claim 1, wherein determining the successive estimated time occurs iteratively until: a time between an estimated time and the desired time is less than a tolerance zone, or an iteration threshold is reached.

7. A method as recited in claim 6, wherein determining the successive estimated time comprises determining a final estimated time that estimates the desired time;
determining that: a time between the final estimated time and the desired time is less than the tolerance zone, or that the iteration threshold has been reached; and
playing the file beginning at the final estimated time or at the desired time.

8. A method as recited in claim 1, wherein the determining of the successive estimated time comprises:
calculating a bitrate for a portion of the file between the previously estimated time and the selected known time;
multiplying the bitrate for the portion by the desired time to determine an estimated position that estimates a desired position that corresponds to the desired time;
retrieving a data sample at the estimated position; and
extracting the successive estimated time from the estimated position.

9. One or more computer-readable media storing computer-executable instructions that, when executed on one or more processors, performs acts comprising:
receiving a request to locate a desired time corresponding to a desired position within a file; and
locating the desired position within the file by iteratively estimating the desired position and without having access to an index specifying where the desired position resides within the file, the locating the desired position comprising:
determining a first estimated time within the file responsive to the receiving of the request, the first estimated time comprising an estimate of the desired time;
determining a second estimated time within the file with use of the first estimated time, the second estimated time also comprising an estimate of the desired time; and
iteratively estimating the desired position until a time between an estimated time and the desired time is less than a tolerance zone or an iteration threshold is reached, the iteratively estimating comprising:
determining a successive estimated time within the file with use of a previously estimated time and a known time selected from a group of known times within the file, the successive estimated time comprising an estimate of the desired time, wherein:

when the previously estimated time is less than the desired time, the known time is selected that is greater than the desired time and has a known position that most closely brackets the desired time with a known position of the previously estimated time; and when the previously estimated time is greater than the desired time, the known time is selected that is less than the desired time and has a known position that most closely brackets the desired time with a known position of the previously estimated time.

10. One or more computer-readable media as recited in claim 9, wherein the file comprises data within an advanced systems format (ASF) container.

11. One or more computer-readable media as recited in claim 9, the determining the successive estimated time comprising:

calculating a bitrate for a portion of the file between the previously estimated time and the known time;
  multiplying the bitrate for the portion by the desired time to determine an estimated position that estimates the desired position;
  retrieving a data sample at the estimated position; and
  extracting the successive estimated time from the estimated position.

12. A method comprising:
receiving a request to seek to a desired time within a file;
determining a first estimated time within the file responsive to the receiving of the request, the first estimated time comprising an estimate of the desired time;
determining a second estimated time within the file with use of the first estimated time, the second estimated time also comprising an estimate of the desired time; and
determining a successive estimated time within the file with use of a previously estimated time and a selected known time selected from a group of known times within the file, the successive estimated time also comprising an estimate of the desired time, wherein:

when the previously estimated time is less than the desired time, the selected known time is selected that is greater than the desired time and that most closely brackets the desired time with the previously estimated time; and
  when the previously estimated time is greater than the desired time, the selected known time is selected that is less than the desired time and that most closely brackets the desired time with the previously estimated time.

13. A method as recited in claim 12, further comprising progressively downloading or streaming the file and wherein the request to seek to the desired time within the file is received before the file finishes downloading or streaming.

14. A method as recited in claim 12, wherein the determining of the first estimated time comprises:
  calculating a bitrate for the file;
  multiplying the bitrate for the file by the desired time to determine an estimated position that estimates a desired position corresponding to the desired time;
  retrieving a data sample at the estimated position; and
  extracting the first estimated time from the estimated position.

15. A method as recited in claim 12, wherein the determining of the second estimated time comprises:
  determining a first known time that most closely brackets the desired time with the first estimated time, the first known time being:
    greater than the desired time when the first estimated time is less than the desired time; or
    less than the desired time when the first estimated time is greater than the desired time;
  calculating a bitrate for a portion of the file between the first estimated time and the first known time;
  multiplying the bitrate for the portion by the desired time to determine an estimated position that estimates a desired position that corresponds to the desired time;
  retrieving a data sample at the estimated position; and
  extracting the second estimated time from the estimated position.

16. A method as recited in claim 12, wherein determining the successive estimated time occurs iteratively until: a time between an estimated time and the desired time is less than a tolerance zone, or an iteration threshold is reached.

17. A method as recited in claim 16, wherein determining the successive estimated time comprises determining a final estimated time that estimates the desired time and determining that:
  a time between the final estimated time and the desired time is less than the tolerance zone; or
  that the iteration threshold has been reached; and playing the file beginning at the final estimated time or at the desired time.

* * * * *